United States Patent
Dave et al.

(10) Patent No.: US 10,296,622 B1
(45) Date of Patent: May 21, 2019

(54) ITEM ATTRIBUTE GENERATION USING QUERY AND ITEM DATA

(75) Inventors: Pratik Suresh Dave, Seattle, WA (US); Randall Winston Puttick, Mercer Island, WA (US)

(73) Assignee: Amazon Technologies, Inc., Reno, NV (US)

(*) Notice: Subject to any disclaimer, the term of this patent is extended or adjusted under 35 U.S.C. 154(b) by 182 days.

(21) Appl. No.: 13/441,710

(22) Filed: Apr. 6, 2012

Related U.S. Application Data

(63) Continuation of application No. 11/277,872, filed on Mar. 29, 2006, now Pat. No. 8,156,073.

(51) Int. Cl.
*G06F 17/30* (2006.01)

(52) U.S. Cl.
CPC .... *G06F 17/3053* (2013.01); *G06F 17/30477* (2013.01); *G06F 17/30598* (2013.01); *G06F 17/30864* (2013.01)

(58) Field of Classification Search
CPC .......... G06F 17/3053; G06F 17/30864; G06F 17/30598; G06F 17/30312; G06F 17/30424; G06F 17/30675; G06F 17/30477; G06F 17/30528; G06F 17/30672; G06F 17/2785; G06F 17/30336; G06F 17/30705; G06F 17/30
See application file for complete search history.

(56) References Cited

U.S. PATENT DOCUMENTS

| | | | |
|---|---|---|---|
| 6,014,639 A | 1/2000 | Fohn et al. | |
| 6,564,213 B1 * | 5/2003 | Ortega | G06F 17/3064 |
| 6,772,150 B1 * | 8/2004 | Whitman | G06F 17/30448 |
| | | | 707/721 |
| 6,944,599 B1 * | 9/2005 | Vogel | G06Q 20/20 |
| | | | 705/35 |
| 7,330,852 B2 | 2/2008 | Bailey et al. | |
| 7,657,506 B2 | 2/2010 | Levin | |
| 7,734,622 B1 | 6/2010 | Fitzhugh | |
| 7,756,887 B1 * | 7/2010 | Haveliwala | 707/769 |
| 2003/0167209 A1 | 9/2003 | Hsieh | |

(Continued)

OTHER PUBLICATIONS

Dale, et al., "Dynamic Document Delivery: Generating Natural Language Texts on Demand," Mri Language Technology Group, Macquarie University, Sydney NSW 2109 Australia, Proceeding, 9th International Workshop on Aug. 25-28, 1998, pp. 131-136, Vienna Austria, Database and Expert System Applications.

(Continued)

*Primary Examiner* — David T. Brooks
*Assistant Examiner* — Berhanu Mitiku
(74) *Attorney, Agent, or Firm* — Robert C. Kowert; Meyertons, Hood, Kivlin, Kowert & Goetzel, P.C.

(57) ABSTRACT

Arrangements and methods provide item data information to one or more merchants. A Web server includes various modules that interact with customer item search queries and item data to create a set of attributes that is sent to a merchant as part of an item data form. The set of attributes included on the form is designed to aid in describing and identifying various items that a merchant may offer or currently offer for purchase on an e-commerce service provider. The set of attributes may also be used to augment or generate an item attribute index usable in conjunction with a service provider searching mechanism related to items offered for sale.

32 Claims, 8 Drawing Sheets

(56) References Cited

U.S. PATENT DOCUMENTS

| | | | |
|---|---|---|---|
| 2003/0204486 A1* | 10/2003 | Berks et al. | 707/1 |
| 2004/0098313 A1* | 5/2004 | Agrawal | G06Q 20/00 705/51 |
| 2004/0122812 A1 | 6/2004 | Yoshimura et al. | |
| 2005/0033777 A1 | 2/2005 | Moraes et al. | |
| 2005/0131764 A1 | 6/2005 | Pearson et al. | |
| 2005/0154745 A1 | 7/2005 | Hansen et al. | |
| 2005/0192944 A1 | 7/2005 | Flinchem | |
| 2005/0234906 A1* | 10/2005 | Ganti et al. | 707/5 |
| 2005/0267949 A1* | 12/2005 | Scott, III | 709/219 |
| 2006/0004712 A1 | 1/2006 | Hakala et al. | |
| 2006/0080274 A1* | 4/2006 | Mourad | 707/1 |
| 2006/0136411 A1 | 6/2006 | Meyerzon et al. | |
| 2006/0224954 A1* | 10/2006 | Chandler | G06F 17/30876 715/255 |
| 2007/0100842 A1 | 5/2007 | Wykes et al. | |
| 2007/0150365 A1 | 6/2007 | Bolivar | |
| 2007/0220055 A1 | 9/2007 | Gong et al. | |
| 2008/0201098 A1 | 8/2008 | Manfredi | |
| 2009/0198693 A1 | 8/2009 | Pura | |

OTHER PUBLICATIONS

Nomura, et al., "Generating Ambiguous Attributes for Fuzzy Queries," Department of Instrumentation, Faculty of Science and Technology, Keio Univ., 1992, IEEE, all pages.

"Features: Query suggestions" retrieved Nov. 30, 2009 at <http://www.google.com/support/websearch/bin/answer.py?hl=en&answer=106230>, Google web search, 2 pages.

"Google Suggest FAQ" retrieved on Nov. 30, 2009 at <http://labs.google.com/intl/es/suggestfaq.html>, Google, 3 pages.

"Google Suggest for Firefox" retrieved Nov. 30, 2009 at <<http://www.google.com/tools/firefox/suggest/>>, Google, 2 pages.

"Google Suggest Improves" retrieved on Nov. 30, 2009 at <http://googlesystem.blogspot.com/2009/05/google-tests-improved-google-suggest.html> Google, 4 pages.

"Official Google Blog: Faster is better on Google Suggest" retrieved on Nov. 30, 2009 at <http://googleblog.blogspot.com/2009/05/faster-is-better-on-google-suggest.html> Google, 1 page.

* cited by examiner

EXEMPLARY
MERCHANT ITEM DATA
FORM

← 700

MERCHANT ITEM DATA FORM

MERCHANT TITLE: MANUFACTURERNAME PRECISION FLATBED
PHOTO SCANNER 300XPD
— 702

ATTRIBUTE TAGGING:
TITLE: MANUFACTURERNAME PRECISION FLATBED PHOTO
SCANNER 300XPD
ITEM LINE: MANUFACTURERNAME PRECISION
MODEL: 300XPD
SCANNER TYPE: FLATBED SCANNER
704

GENERALIZATION:
ITEM TYPE: ACCESSORIES SCANNERS FLATBED SCANNERS
COMPATIBILITY: PC; MAC
PRINTER-TYPE: MULTIFUNCTION PRINTER
SCANNER-INTERFACE: USB
OPERATING SYSTEM: WINDOWS; OSX
MEDIA-TYPE: PHOTO
SUPPORTED MEDIA: PAPER; TRANSPARENCY; SLIDE
POWER: 120 VOLTS
706

Fig. 7

ITEM ATTRIBUTE GENERATION USING QUERY AND ITEM DATA

This application is a continuation of U.S. application Ser. No. 11/277,872, filed Mar. 29, 2006, which is incorporated by reference herein in its entirety.

BACKGROUND

Companies often face unique problems when trying to sell items over a network, such as the Internet. For example, unlike traditional brick-and-mortar businesses, e-commerce companies do not have a physical store or location where a salesperson can help both novice and knowledgeable customers find sought after items. In the Web environment, it is the customers' responsibility to identify an item that meets their needs. Even customers with considerable experience navigating websites associated with e-commerce companies find it difficult to locate a desired item from among hundreds of offered items. And for novice customers, the task of shopping online using the Web can be unproductive and frustrating.

Companies with e-commerce websites look for ways to make their Web sites more dynamic and compelling and, at the same time, easier for customers to navigate and locate items. To that end, item search mechanisms are offered, such as keyword item search engines. Search mechanisms often provide either zero item hits or hundreds of item hits with varying degrees of relevance. In the case of many item hits, it is up to the customer to sort through the results, which can be inefficient.

One approach to refining item search mechanisms relates to manufactures and merchants describing their item with a certain level of particularity. For example, a manufacturer or merchant might describe their items using attributes and values that can be added to a searchable index connected to an item search mechanism.

Obtaining the attributes and values connected with an item is a manual process. For example, a manufacturer or merchant may be given an item summary document to describe attributes and values for an identified item. The manufacturer or merchant then completes the item summary document and returns it to the requesting party. The attributes and values specified on the summary document can be used to augment a searchable index.

SUMMARY

Generating item attributes and values based on a descriptive item title provided by a merchant or other entity is described. The generated attributes and values are fed back to the merchant as part of an item data form that includes a reference to a descriptive title and the generated attributes and values. The attributes may assist a merchant in properly identifying items that they may offer or currently offer. The generated attributes may also be used as part of an item attribute index that is connected to an item search mechanism.

Attributes and values may be generated using two processes. One process considers a general context derived from a descriptive title and contents of a data search index. Another process considers a general context derived from a descriptive title, stored customer queries and contents of a data search index. The processes may be used individually or together to generate attributes and values for inclusion on an item data form and/or as part of a data search index that is connected to a search mechanism.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 7 is an exemplary implementation of an item data form that may be communicated to a merchant. The item data form may include data obtained using the processes illustrated in FIGS. 5 and 6.

DETAILED DESCRIPTION

Overview

This disclosure is directed to arrangements and methods that provide item data information to one or more merchants. A combination of item search queries and item data may be used to create a set of attributes describing an identified item. The resulting set of attributes may also be used to augment or generate an item attribute index. The item attribute index may be used with various searching mechanisms to enable consumers to search for items. Such items may identify products and/or services for sale, products and/or services for use, and/or products and/or services for selection via one or more merchants.

In one implementation, an item title supplied by a merchant is parsed to create several substrings. In one example, each substring includes two terms from the item title. The substrings are used to search an item attribute index that corresponds to attribute data associated with a set of items. Item attributes in the item attribute index that include the substrings are saved as possible candidates for communication to a merchant. After each of the substrings is used to search the item attribute index, the most-frequently identified attributes are compiled and added to an item data form for dissemination to a merchant. The first implementation is referred to in this document as attribute tagging.

In another implementation, information provided on an item data form is further augmented with attributes obtained using customer search query information and item data in a search index. A word pair associated with an item title is used to search a customer item search index that corresponds to previously collected customer queries. The matching customer queries are used to search the item attribute index. The most frequently identified attributes from the item attribute index are accounted for and added to an item data form for dissemination a merchant. The second implementation is referred to as generalized attribute tagging.

The described implementations may be used together or standing alone to automatically provide attributes and values for a selected item. The arrangements and methods described in this disclosure may be implemented in a number of ways. At least one example implementation is described below with reference to FIGS. 1-8.

System Architecture

Figure 1:
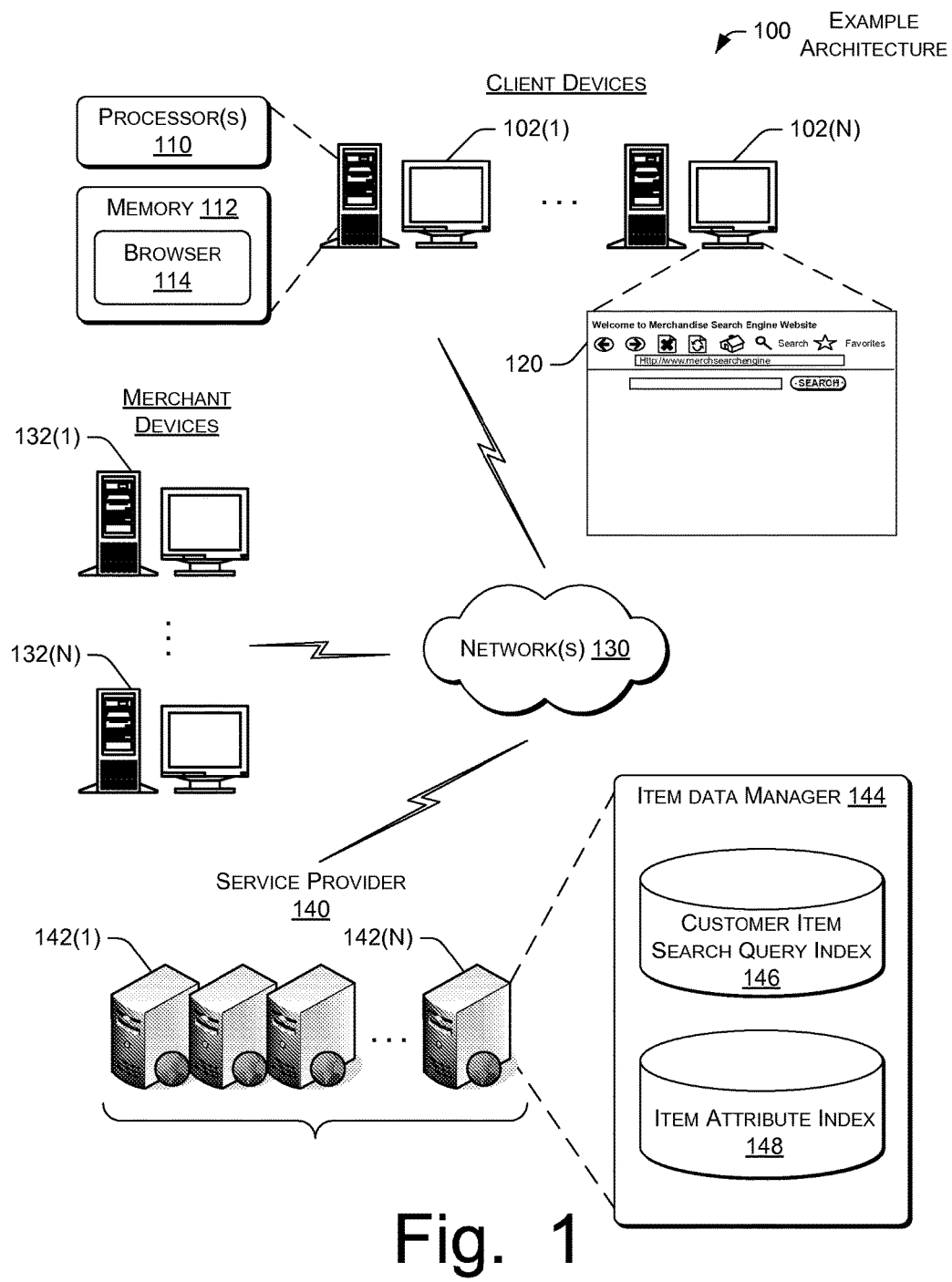
FIG. 1 illustrates an example architecture in which several client devices and merchant devices communicate with a service provider via a network or series of networks. The service provider may be associated with an entity that offers items via a network.

FIG. 1 illustrates an example architecture 100 in which several client devices 102(1)-102(N) and merchant devices 132(1)-132(N) communicate with a service provider 140 via a network 130. The service provider 140 may be associated with an entity that offers items via the network 130. The network 130 is representative of many different types of networks, such as cable networks, the Internet, and wireless networks.

The service provider 140 is hosted on one or more servers 142(1)-142(N), perhaps arranged as a server farm. Other server architectures may also be used to host the site. The service provider 140 is capable of handling requests from many entities and serving, in response, various Web pages 120 that can be rendered at the client devices 102 and the merchant devices 132. The service provider 140 is representative of essentially any site supporting user interaction, including retailers, informational sites, search engine sites, news and entertainment sites, and so forth.

The client devices 102 and the merchant devices 132 (also referred to as "computers" or simply "devices") are illustrated as personal computers, but may also be implemented as other devices, such as a set-top box, a game console, a laptop computer, a portable digital assistant (PDA), a mobile phone, and so forth. Each device 102 and 132 is equipped with one or more processors 110 and a memory 112 to store applications and data (shown only with device 102). A browser application 114 is shown stored in the memory 112 and executes on the processor 110 to provide access to the service provider 140. The browser 114 renders one or more Web pages 120 served by the service provider 140 on an associated display.

The service provider 140 is configured to support providing item data to one or more merchants. The one or more merchants may use one or more of the merchant devices 132 to receive item data from the service provider 140. As is described in greater detail later, item data provided to one or more merchants may be in the form of an electronic item data form that includes item attributes discovered based at least in part on an item title supplied by a merchant or other entity.

An item data manager 144 runs on one or more of the servers 142(1)-142(N) to manage creating and disseminating item data to one or more merchant devices. The item data manager 144 includes a customer item search query index 146 and an item attribute index 148. The customer item search query index 146 includes various item queries that customers entered on the Web page 120 rendered using the browser application 114 associated with a client device 102. The item attribute index 148 includes various items that are identified by attributes and associated values. More generally, an item's attribute may be considered a parameter that has relation to the item. For example, attributes associated with a laser printer may include: manufacturer, resolution, print speed, and operating system compatibility. Values associated with such attributes define the attributes for a given item. Therefore, for the given example attributes, the respective values might be: Epson, 600 dpi, 20 ppm, and Windows XP/OS X.

Exemplary Item Data Manager Implementation

Figure 2:
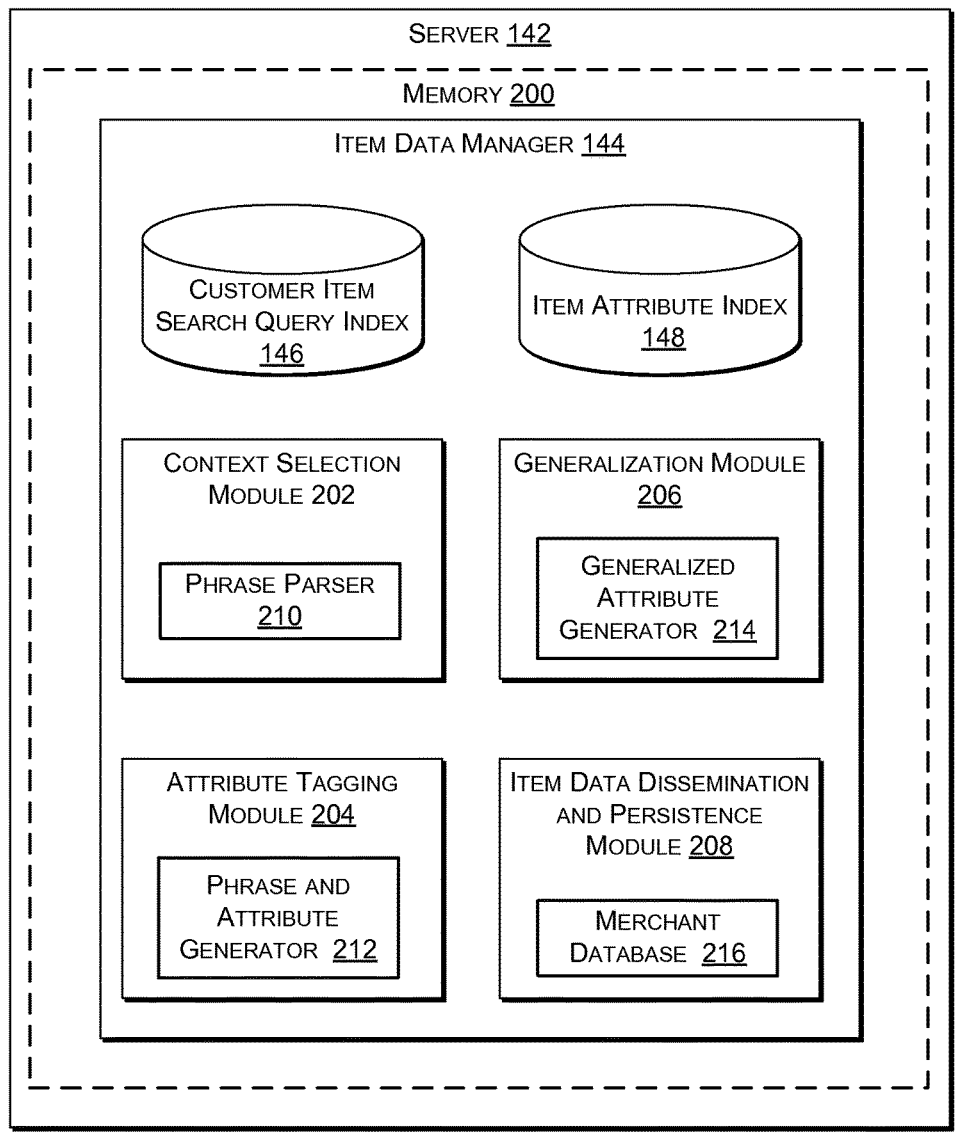
FIG. 2 illustrates an exemplary implementation of a server computing device that may be used by an entity that offers merchandise for purchase via the Web. The server is illustrated as including an item data manager component for producing and managing item data information that may be disseminated to various merchants.

FIG. 2 illustrates an exemplary implementation of one or more of the servers 142(1)-142(N) that may be used by a service provider that offers items via a network, such as the network 130. The Web server 142 is illustrated as including a memory 200 that stores the item data manager 144. The Web server 142 includes at least one processor that may be used to execute computer-executable instructions stored in the memory 200. The item data manager 144 is capable of producing and managing item data that may be disseminated to various merchants.

The Web servers 142(1)-142(N) have processing capabilities and memory suitable to store and execute computer-executable instructions. In this example, the item data manager 144 is implemented as software modules or computer-executable instructions stored in the memory 200 of the Web server(s) 142 and executed by one or more processors of the Web server(s) 142. The memory 200 may be implemented as non-removable persistent storage of the Web servers 142, although other suitable computer storage media may also be used to store the item data manager 144. An example of an exemplary computer system that may be used to implement the Web servers 142 is provided below with reference to FIG. 8.

As described above, the item data manager 144 includes search indexes 146 and 148. The customer item search query index 146 stores multiple customer queries that were stored by the Web server 142 during instances where prospective customers accessed the service provider 140 in search of one or more items. The service provider 140 may store various Web pages (e.g., Web pages 120) that offer browsing customers options for searching for and purchasing items offered for sale. The searches entered through these various Web pages are captured and stored by the customer item search query index 146. The item data manager 144 facilitates this process.

The item attribute index 148 includes descriptive information related to items offered through the service provider 140. The descriptive information is generally in attribute/value format. For example, in the case of a digital camera, one such attribute may be "MediaType" and the associated value might be "photo." The descriptive information of the item attribute index 148 is generally compiled from merchant item data submissions that are provided by merchants before their items are offered for sale through the service provider 140. As will be explained below, the descriptive information may also originate from the exemplary implementations described herein. The item attribute index 148 may be tied to a searching mechanism offered by the service provider 140. As those skilled in the art appreciate, such a searching mechanism may enable users to search for items in the item attribute index 148 using keywords or parameters that describe an item.

General Context Selection

The item data manager 144 incorporates the use of a context selection module 202. The context selection module 202 is capable of selecting a general context from a descriptive item title. A general context may be a word, a plurality of words, or a phase that is extracted from a descriptive item title. As is described later, the general context may be used to limit an amount of item data considered in conjunction with an attribute tagging process. Similarly, the general context may be used to limit a number of customer queries considered in conjunction with a generalized attribute tagging process.

Generally, an item title is provided by a merchant or otherwise acquired, and describes with some specificity a selected item for which attributes will be generated. To assist in the general context selection process, the context selection module 202 employs the use of a phrase parser 210 to generate one or more phrases from the words of the item title. In one implementation, the phrase parser 210 uses pairs of adjacent words in the item title to generate the two-word phrases.

The context selection module 202 uses each of the parsed phrases as a search phrase during a searching process of the customer item search query index 146. The context selection module 202 accumulates the number of times each one of the phrases is identified in a customer query. The context selection module 202 selects the most-frequently identified two-word phrase as a general context.

Attribute Tagging

The item data manager 144 may also include an attribute tagging module 204 that is generally responsible for identifying a select number of attributes and associated values for inclusion in an item data report that may be disseminated to a merchant. Unlike the generalized tagging process described below, the attribute tagging module 204 defines a focused and defined set of attributes and values that are associated with an item title, or other descriptor. More specifically, the attribute tagging module 204 implements a phrase and attribute generator 212, which has two specific functions. One of those functions includes generating multiple substrings from the words of the item title. Another of those functions includes using the generated multiple substrings to identify corresponding attributes in the item attribute index 148 that include the multiple substrings.

In one exemplary implementation, the phrase and attribute generator 212 uses a lexical tree process that parses the item title into multiple substrings that each contain terms from the item title. For example, suppose an item title includes alphanumeric terms represented by letters "a b c d", using the lexical tree process, the phrase and attribute generator 212 will generate multiple substrings that include {"a", "a b", "a b c", "a b c d", "b", "b c", "b c d", "c", "c d", "d"}. The alphanumeric terms may be words, a combination of words, numbers, combined numbers and words/letters, or the like. Other decoding processes may be used to generate multiple substrings as well.

In a first step, the attribute tagging module 204 searches the item attribute index 148 and flags item data including the general context provided by the context selection module 202. Each detailed item reference in the index 148 includes a title field. Items having title fields matching the general context are flagged. The flagged items represent a subset of item references delimited by the general context.

In a second step, the phrase and attribute generator 212 searches the flagged item references in the item attribute index 148 for attributes that match the multiple substrings generated by the phrase and attribute generator 212. The attribute tagging module 204 stores each matching attribute and its associated value. Redundant attributes/values are not added to the set, but a running total indicating how may times an attribute includes the search phrase is maintained in each generated attribute set. The attribute set may be held in a memory space of the attribute tagging module 204, or another available memory location of the Web server 142 (e.g., the memory 200)

After the attribute sets for matching substrings are created, the phrase and attribute generator 212 references the attribute sets and creates an ordered list of attributes and their associated values. In one implementation, the ordered list may be ordered according to most-frequently identified attribute to the least-frequently identified attribute. The ordered list of attributes may be achieved, as attributes are saved in their respective sets. Additionally, the attribute tagging module 204 can limit the number of the attributes from the ordered list for inclusion in an item data form for dissemination to a merchant. For example, the attribute and tagging module 204 may save a percentage (e.g., 1%), or a predetermined number of the attributes in the ordered list.

Generalized Attribute Tagging

The item data manager 144 can also include a generalization module 206 that can also identify a number of attributes and associated values for inclusion in an item data report that may be disseminated to a merchant. The attributes and values generated by the module 206 are found using an alternative process than the process described in connection with the attribute tagging module 212.

In a first step, a generalized attribute generator 214 searches the customer item search query index 146 and flags queries therein that match the general context. This is in contrast to the attribute tagging module 204, which searches the item attribute index 148 and flags item data therein that include the general context. The flagged queries represent a subset of customer queries delimited by the general context. The generalized attribute generator 214 extracts terms from each of the flagged queries, discarding those terms that match the general context. Redundant terms extracted from the queries are also discarded during the extraction process. The described process creates a set of terms extracted from customer queries that included the general context; the set of terms is held in a memory space of the generalization module 206, or another available memory location of the Web server 142 (e.g., the memory 200).

In a second step, the generalized attribute generator 214 uses each of the terms included in the set of terms as a search phrase during a search of the item attribute index 148. More particularly, the generalized attribute generator 214 searches the item attribute index 148 for attributes that contain a reference to each of the terms included in the previously generated set of terms. Again, only the flagged items in the item attribute index 148, which represent a subset of item references delimited by the general context, are referenced in the search. For each term (search phrase) in the set of terms, the generalized attribute generator 214 saves matching attributes, and its associated value. In one implementation, redundant attributes are not added to the set, but a running total indicating how may times an attribute includes the search phrase is maintained in each generated attribute set.

After the attribute sets for each of the terms included in the set of terms maintained by the generalization module 206 are created, the generalized attribute generator 214 creates an ordered list of attributes and their associated values. In one implementation, the list may be ordered according to most-frequently identified attribute to a least-frequently identified attribute. Note, the process of ordering the attributes may be accomplished, at least in part, as attributes are saved in their respective sets. The generalization module 206 can limit the number of attributes in the ordered list. For example, the generalization module 206 may save a percentage (e.g., 1%), or a predetermined number of the total attributes in the ordered list.

Item Data Dissemination

The item data manager 144 also includes an item data dissemination and persistence module 208 that is used primarily to collect attributes and associated values assembled by the modules 204 and 206, as described above. The module 208 categorizes and incorporates the collected attributes as part of an item data form that is for communication to a merchant or other relevant entity. The item data dissemination and persistence module 208 may include a merchant database 216 that contains merchant contact information (e.g., phone numbers, addresses, email addresses, etc.) that may be used to properly communicate item data forms to intended merchant recipients. The module 208 may use any known communication medium, such as the Web, to communicate item data forms to merchants.

Exemplary Search Index Implementations

Figure 3:
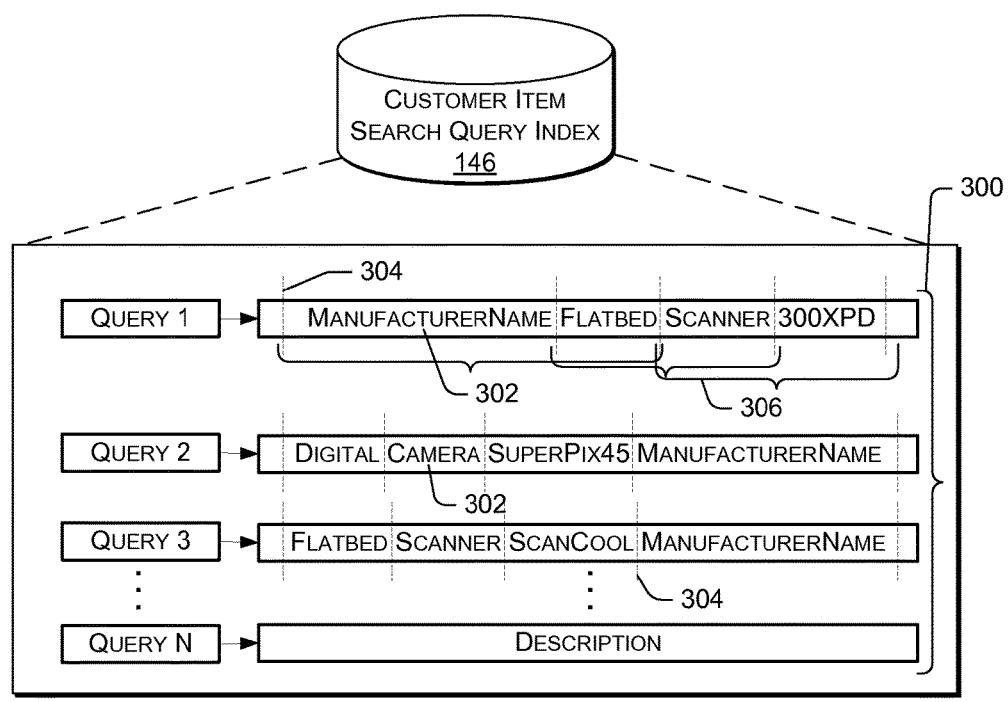
FIG. 3 illustrates an exemplary implementation of a customer item search query index that may be associated with a server computing device used by an entity. The customer item search query index generally includes a plurality of captured customer search queries related to item inquiries.
Figure 4:
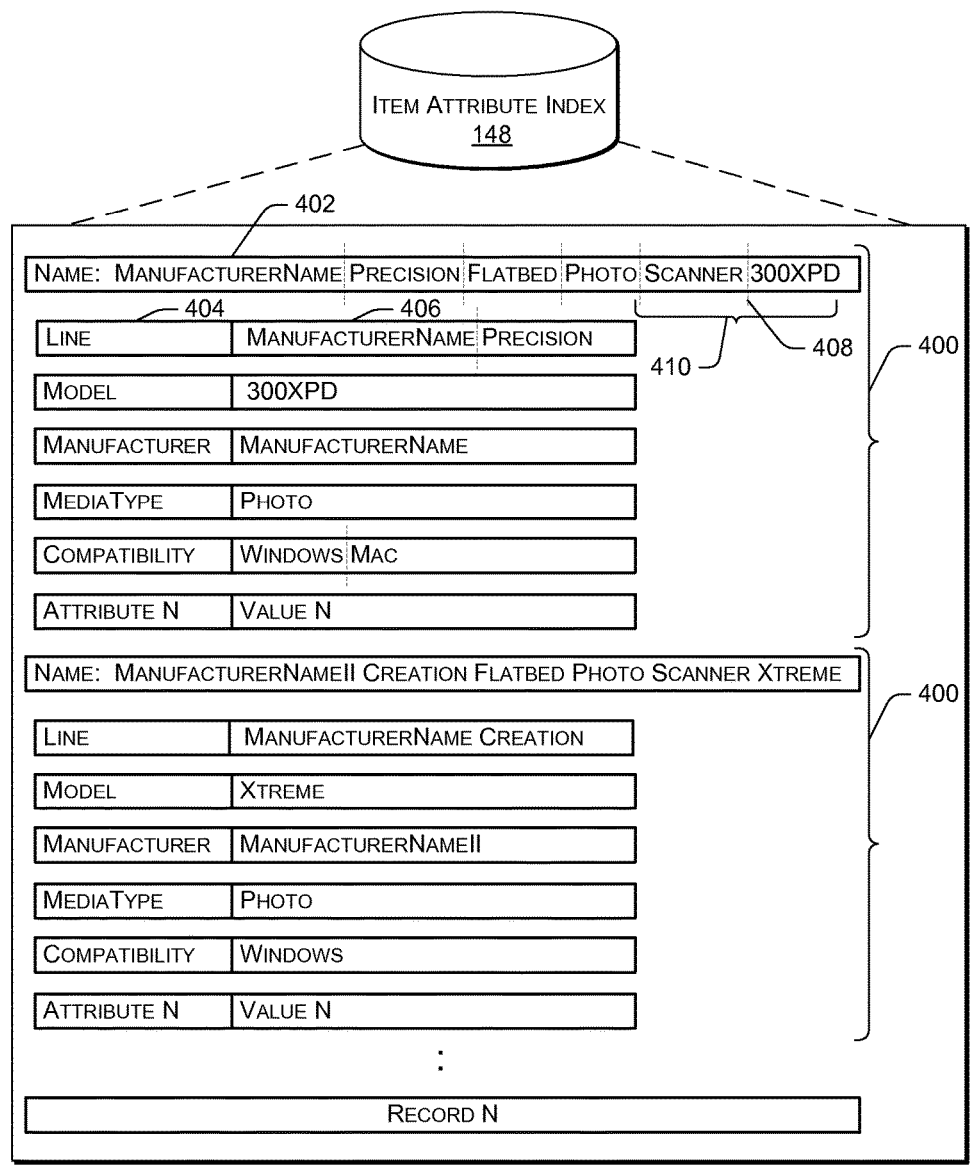
FIG. 4 illustrates an exemplary implementation of an item attribute index that may be associated with a server computing device used by an entity. The item attribute index generally includes a plurality of item descriptions. Each item description may include a number of attributes and values that describe an item.

FIGS. 3 and 4 illustrate exemplary implementations of the customer item search query index 146 and the item attribute index 148, respectively. Searchable indexes and databases are readily understood by artisans skilled in the art. As is illustrated in FIG. 3, the customer item search query index 146 includes a plurality of queries 1, . . . , N. Each of the queries 1, . . . , N includes at least one data field 300. The data fields 300 contain query parameters 302 that were entered by a user that interfaced with the service provider 140. The customer quires are captured as they are received by the service provider 140.

In FIG. 3, the query parameters 302 are separated by dashed lines 304. The dashed lines 304 represent that each element (e.g., a word) of the query parameters 302 may be identified when a keyword/search phrase inquiry of the index 146 is made. The query parameters 302 are also separated by brackets 306 to show that the elements of the query parameters 302 may be grouped together and appropriately identified when a keyword inquiry of the index 146 is made. As discussed above, in one aspect the item data manager 144 searches the customer item search query index 146 to generate a general context. In one implementation, the general context is found using the context selection module 202. As also discussed, in another aspect, the item data manager 144 also uses the customer item search index 146 in various ways to generate generalized attributes for inclusion in an item data form that may be disseminated to a merchant.

Turning now to FIG. 4, as is illustrated, the item attribute index 148 may include a number of item records 400. Each of the item records 400 comprises a title field 402 and a number of attribute fields 404. Each attribute field 404 includes an associated value field 406. FIG. 4 depicts illustrative examples of the types of item attributes that may be included in the attribute fields 404. Similarly, examples of the types of values that may be associated with the attributes are also illustrated in FIG. 4. The title field 402 holds a title of a respective item detailed by the attribute fields 404 and the associated value fields 406. As should be readily understood, the item attribute index may hold a large number of item records 400. This is exemplified in FIG. 4 using the reference record N. Similarly, each item record 400 may have a number of attribute fields 404 and associated value fields 406. This is exemplified in FIG. 4 using attribute N and value N.

The contents of the item records 400 are shown as being separated by dashed lines 408. The dashed lines 408 represent that elements (e.g., a word) of the item records 400 may be identified when a keyword/search phrase inquiry of the index 148 is made. The elements of the item records 400 may also be grouped together and appropriately identified when a keyword inquiry of the index 148 is made. A bracket 410 illustrates this concept. As discussed above, the item data manager 144 references the item attribute index 148 during the various attribute generation processes discussed above.

Operation

Figure 5:
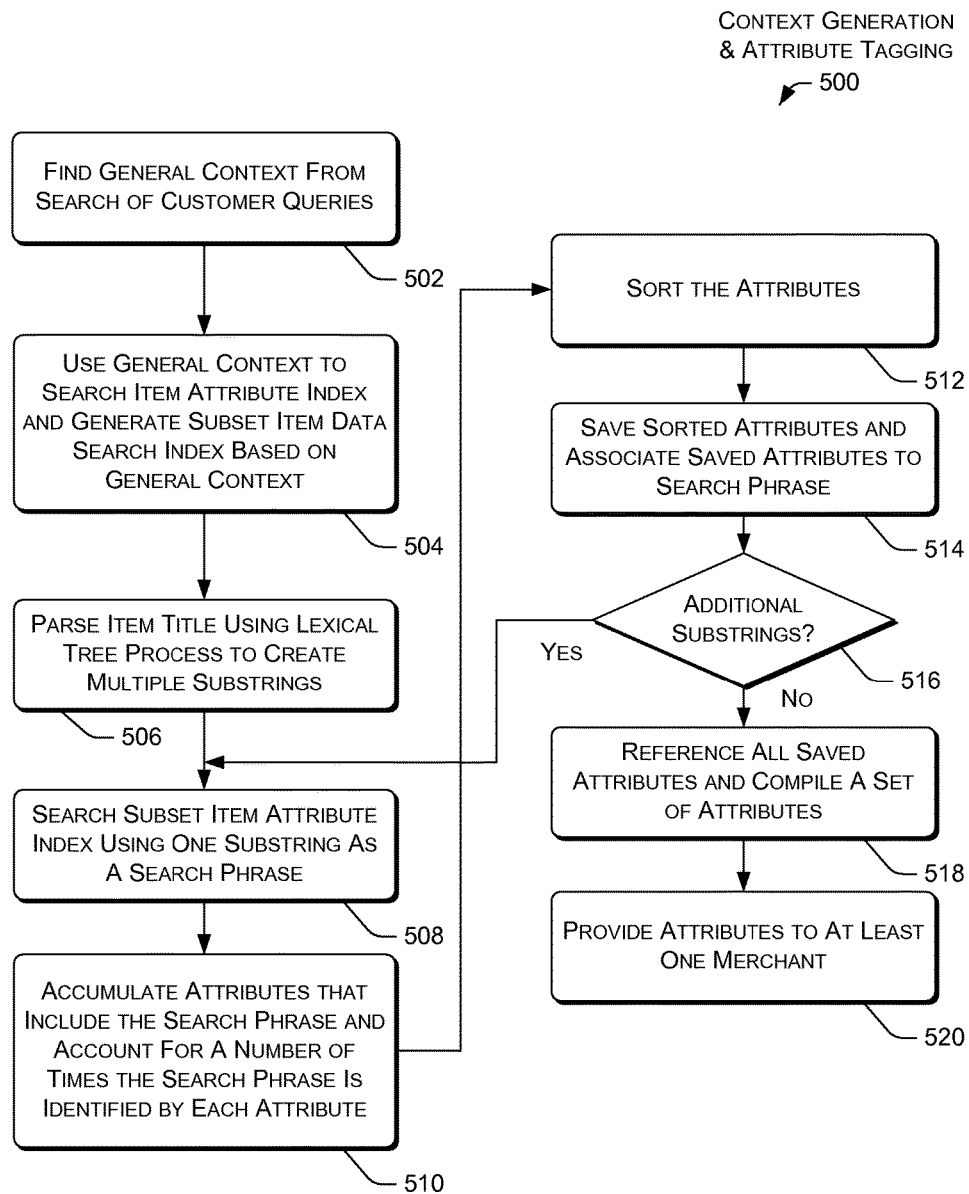
FIG. 5 is a flow diagram of a computer implemented attribute tagging process that uses at least item descriptions to create item data that may be disseminated to a merchant.
Figure 6:
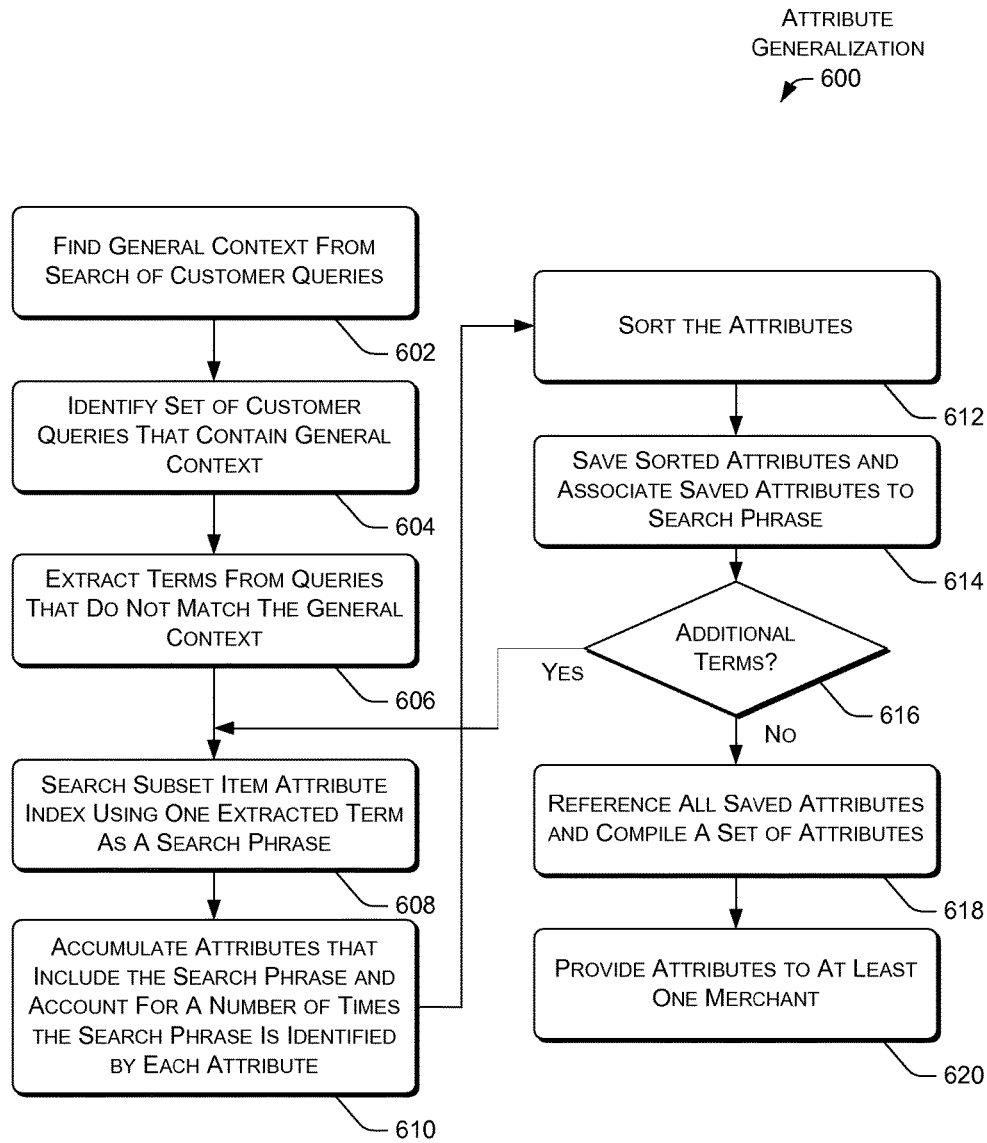
FIG. 6 is a flow diagram of a computer implemented generalized attribute tagging process that uses at least customer queries to create item data that may be disseminated to a merchant.

FIGS. 5-6 illustrate example processes for finding and generating attributes and related data that may be included in an item data form for dissemination to a merchant or other entity. The example processes may be initiated when a service provider receives an item title that is associated with an item a merchant would like to offer for sale. Each process is illustrated as a collection of blocks in a logical flow graph. The collection of blocks represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the processes are described with reference to the example architecture 100 of FIG. 1, and the item data manager 144 described with reference to FIGS. 1-4. In particular, many acts described below may be implemented and performed by the item data manager 144 illustrated in FIGS. 1-4.

Processes described in connection with FIGS. 5-6 provide a plurality of attributes and associated values that may be included on an item data form disseminated to a merchant. An attribute tagging process 500 described in connection with FIG. 5 generates a set of attributes that is based on a general context derived from a descriptive item title and reference to item data stored in an item attribute index. A generalized tagging process 600 described in connection with FIG. 6 generates a set of attributes that is based on a general context derived from a descriptive item title, terms associated with customer queries and reference to item data stored in an item attribute index. Nevertheless, the processes illustrated in FIGS. 5-6 and described herein may be used individually or together to create item data information that may be disseminated to a merchant or other entity.

Attribute Tagging Process

FIG. 5 shows a process for context generation and attribute tagging 500 that may be used to create item data for dissemination to a merchant. At block 502, a general context corresponding to a title is found from a search of customer queries. In one implementation, the item data manager 144 uses the context selection module 202 to find a general context from a descriptive item title that was supplied by a merchant. As described above, the item data manager 144 references the customer item search query index 146 in the process of generating the general context.

Next, at block 504, the general context is used to search the item attribute index 148. The title fields 402 in the index 148 are searched to determine whether the general context is referenced in a given record. The records in the item attribute index 148 that include the general context are flagged. In one implementation, the attribute tagging module 204 performs this flagging function. The flagged records define a subset of item records in the index 148.

At block 506, the descriptive item title is parsed to create multiple substrings. In one implementation, a lexical tree process is used to create the multiple substrings. However, other text related permutation sorting processes may be used in the place of the lexical tree process described herein. The phrase and attribute generator 212 may be used to generate the multiple substrings.

At block 508, a first of the multiple substrings is used to search the flagged records in the item attribute index 148. Recall, the flagged records are those that include a reference to the general context. The item data manager 144, in one implementation, uses the attribute tagging module 204 to facilitate the search of the flagged records using the chosen one of the multiple substrings as a search phrase. In particular, the search phrase is compared against the attributes of the attribute fields 404 and values of the associated value fields 406 of the flagged records (e.g., the item record 400). At block 510, those attributes that include the search phrase and an associated value field are accumulated. In one implementation, accumulated attributes and associated values are accounted for in a set that is associated with the search phrase. Redundant attributes are not stored in the set, but a running total indicating a number of times each accumulated attribute is identified by the search phrase is maintained.

At block 512, the attributes accounted for in the set are sorted. In one implementation, the list may be sorted from most-frequently identified attribute to least frequently identified attribute. However, any number of alternative sorting criteria may also be utilized. The attributes are sorted with their associated values being maintained therewith. The running totals related to each attribute are used to properly sort the attributes. At block 514, if this has not already occurred, the set including the ordered accumulated attributes and associated values is saved by the attribute tagging module 204. The item data manager 144 makes use of memory space (i.e., the memory 200) belonging thereto to allocate storage of the ordered set of attributes.

At decision block 516, the item data manager 144 determines if there are additional substrings that may be used in a search of the flagged records of the item attribute index 148. The attribute tagging module 204 may make this determination for the item data manager 144. If there are additional substrings, the blocks 508-516 are repeated. Repeating the instructions of blocks 508-516 results in the creation of another ordered set of attributes. A number of ordered sets of attributes should equal the number of substrings generated at block 506.

At block 518, the attributes and associated values in the ordered sets are referenced and a comprehensive ordered set of attributes and associated values is compiled. The comprehensive ordered set is in most-frequently identified attribute to least-frequently identified attribute format. In one implementation, the attribute tagging module 204 creates the comprehensive ordered set. In block 520, a selection of the most-frequently identified attributes and associated values is provided as item data information to at least one merchant. The selection may be based on a predetermined number of the most-frequently identified attributes, or a percentage of the most-frequently identified attributes, or some other desirable criteria for selecting attributes and associated values that are part of the comprehensive list for use as item data information to a merchant or other entity. The identified attributes and associated values may be included on an item data form generated by the item data dissemination and persistence module 216.

Generalized Attribute Tagging Process

FIG. 6 shows a process for attribute generalization 600 that may be used to create generalized item attribute item data for dissemination to a merchant. At block 602, a general context corresponding to a title is found from a search of customer queries. In one implementation, the item data manager 144 uses the context selection module 202 to find a general context from a descriptive item title that was supplied by a merchant. As described above, the item data manager 144 references the customer item search query index 146 in the process of generating the general context.

At block 604, a general context is used to identify a set of customer queries. Again, the general context may be found using the context selection module 202 and is derived from a descriptive item title that pertains to an item that may be offered for sale on the service provider 140. Each query in the set of customer queries includes the general context. More specifically, the set of customer queries may comprise flagged queries in the customer item search query index 146 that include the general context.

At block 606, the set of customer queries is referenced and terms from the queries therein are extracted. These terms, as described in the following, may be used to identify attributes and associated values contained in the item attribute index 148. Terms that match the general context are not extracted; moreover, redundant terms are discarded. In other words, terms are only extracted once from the set of customer queries. Stemming may be performed at block 606 as well (e.g., removal of definite and indefinite articles). In one implementation, the generalization module 214 performs the extraction process. The extracted terms may be saved in a memory space (e.g., the memory 200) allocated to the item data manager 144, and more particularly the generalization module 214.

At block 608, a first of the extracted terms is used to search the flagged records in the item attribute index 148. Recall, the flagged records are those that include a reference to the general context. The item data manager 144, in one implementation, uses the generalized attribute generator 214 to facilitate the search of the flagged records using the chosen one of the extracted terms as a search phrase. In particular, the search phrase is compared against the attributes of the attribute fields 404 and values of the associated value fields 406 of the flagged records (e.g., the item record 300). At block 610, those attributes that include the search phrase and an associated value field are accumulated. In one implementation, accumulated attributes and associated values are accounted for in a set that is associated with the search phrase. Redundant attributes are not stored in the set, but a running total indicating a number of times each accumulated attribute is identified by the search phrase is maintained.

At block 612, the attributes accounted for in the set are sorted. In one implementation, the list may be sorted from most-frequently identified attribute to least-frequently identified attribute. The attributes are sorted with their associated values being maintained therewith. The running totals related to each attribute are used to properly sort the attributes. At block 614, if this has not already occurred, the set including the ordered accumulated attitudes and associated values is saved by the generalized attribute generator 214. The item data manager 144 makes use of memory space (e.g., the memory 200) belonging thereto to allocate storage of the ordered set of attributes.

At decision block 616, the item data manager 144 determines if there are additional extracted terms that may be used in a search of the flagged records of the item attribute index 148. If there are additional extracted terms, the blocks 608-614 are repeated. Repeating the instructions of blocks 608-614 results in the creation of another ordered set of attributes. A number of ordered sets of attributes should equal the number of extracted terms found at block 606.

At block 618, the attributes and associated values in the ordered sets are referenced and a comprehensive ordered set of attributes and associated values is compiled. The comprehensive ordered set is in most-frequently identified attribute to least-frequently identified attribute format. In one implementation, the generalized attribute generator 214 creates the comprehensive ordered set. In block 620, a selection of the most-frequently identified attributes and associated values is provided as item data information to at least one merchant. The selection may be based on a predetermined number of the most-frequently identified attributes, or a percentage of the most-frequently identified attributes, or some other desirable criteria for selecting attributes and associated values that are part of the comprehensive list for use as item data information to a merchant or other entity.

The processes described in connection with FIGS. 5-6 provide a plurality of attributes and associated values that may be included on an item data form disseminated to a merchant. As was likely apparent from the foregoing text, the attribute tagging process 500 described in connection with FIG. 5 generates a set of attributes that is based on a general context derived from a descriptive item title and reference to item data stored in an item attribute index. The generalized tagging process 600 described in connection with FIG. 6 generates a set of attributes that is based on a general context derived from a descriptive item title, terms associated with customer queries and reference to item data stored in an item attribute index. Nevertheless, the processes illustrated in FIGS. 5-6 and described herein may be used individually or together to create item data information that may be disseminated to a merchant or other entity.

The implementations described may be used to augment/build an item attribute index that is similar to the item attribute index 148. For example, from just a descriptive item title, the implementations described herein can generate attributes and associated values that may be used as part of an item attribute index. Therefore, if an e-commerce entity is in possession of a generally robust set of customer queries and item data, it may decide to generate attributes that may be associated with a descriptive item title using the implementations described herein. This practice would reduce or eliminate the need for merchants to complete an item summary document that identifies attributes and associated values that may be used to discover an item offered for sale on an e-commerce entity's service provider.

Exemplary Item Data Form

FIG. 7 illustrates an exemplary implementation of a merchant item data form 700 that may be used to convey attributes and associated values generated using the processes and arrangements described herein. The item data form 700 includes three distinct sections. A title section 702 includes a descriptive item title that may have originated from a merchant title or other entity. The descriptive item title may be used by the implementations described herein to identify a general context and generate attributes and associated values that relate to the descriptive title. The attributes section 704 may include attributes and associated values generated using the attribute tagging module 204 of the item data module 144. In distinction, the generalization section 706 may include attributes and associated values generated using the generalization module 706.

The illustrated item data form 700 is shown in a format that is non-limiting. In particular, content provided on the item data form 700 may be assembled in many different ways. The illustrated item data from 700 may be embodied in electronic format and disseminated using a computer device over a network (e.g., the Internet). The illustrated item data form 700 may also be embodied on paper and disseminated using a facsimile machine, the postal system, or the like.

Exemplary Computing Device

Figure 8:
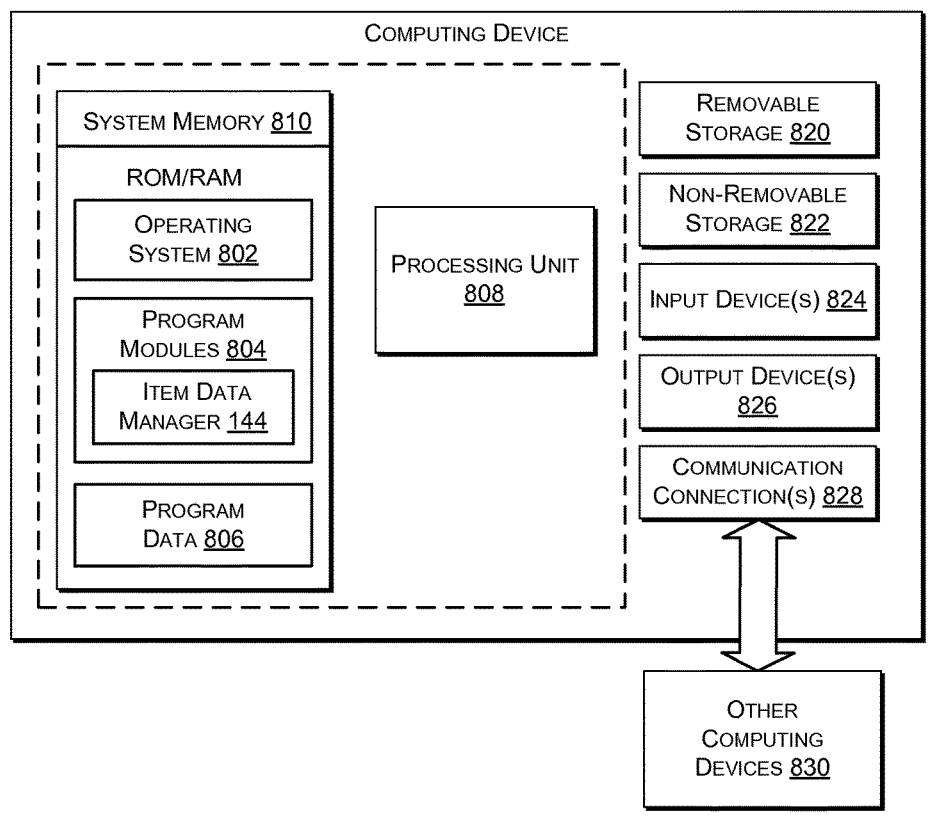
FIG. 8 is illustrates an exemplary implementation of a computing device that includes one or more of the described exemplary components. A client device, merchant device and/or server may be implemented with a device similar to the computing device illustrated in FIG. 8.

FIG. 8 is an illustrative computing device 800 that may be used to implement the Web servers 142(1)-142(M), devices 102(1)-102(K) and 132(1)-132(L). In a very basic configuration, the computing device 800 includes at least one processing unit 808 and system memory 810. Depending on the exact configuration and type of computing device 800, the system memory 810 may be volatile (such as RAM), non-volatile (such as ROM, flash memory, persistent memory, etc.) or some combination of the two. The system memory 810 typically includes an operating system 802, one or more program modules 804, and may include program data 806. For the present implementations, the program modules 804 may include the item data manager 144. As an alternative, the item data manager 144 may be implemented as part of the operating system 802, or it may be installed on the computing device 800 and stored in other memory (e.g., a non-removable storage 822) separate from the system memory 810.

The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage 820 and the non-removable storage 822. Computer storage media may include volatile and nonvolatile, removable and non-removable media implemented in any method or technology for storage of information, such as computer readable instructions, data structures, program modules, or other data. The system memory 810, removable storage 820 and non-removable storage 822 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 800. Any such computer storage media may be part of the device 800. The computing device 800 may also have input device(s) 824 such as keyboard, mouse, pen, voice input device, touch input device, etc. Output device(s) 826 such as a display, speakers, printer, etc. may also be included. These devices are well known in the art and need not be discussed at length.

The computing device 800 may also contain a communication connection 828 that allows the device to communicate with other computing devices 830, such as over a network like the network 130 of FIG. 1. The communication connection(s) 828 is one example of communication media. Communication media may typically be embodied by computer readable instructions, data structures, program modules, or other data in a modulated data signal, such as a carrier wave or other transport mechanism, and includes any information delivery media.

Various modules and techniques may be described herein in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
 performing, by a computing device:
  acquiring a descriptor of an item from a merchant of the item;
  determining a general context for the item, wherein said determining comprises:
   extracting one or more phrases from the descriptor, each phrase comprising one or more alphanumeric words that are included in the descriptor;
   for each of the one or more phrases:
    searching an index of previously-stored customer item search queries to identify occurrences of the phrase within the customer item search queries; and
    accumulating how many times the phrase is identified during said searching; and
   selecting the general context to be one of the one or more phrases most frequently identified during said searching; and
  applying the general context to a set of records to select a subset of the records for further processing.

2. The method of claim 1, wherein the descriptor of the item is a descriptive title for the item.

3. The method of claim 1, wherein the general context is a two-word phrase comprising two adjacent words of the descriptor.

4. The method of claim 1, wherein each record in the set of records:
 is an item record describing a corresponding item;
 includes a title field containing a title describing the corresponding item; and
 includes at least one item attribute field containing an attribute describing the corresponding item.

5. The method of claim 4, wherein each item attribute field of each item record includes an associated value field containing a value of the attribute contained in the attribute field.

6. The method of claim 1, wherein a searchable index containing the set of records is configured for identifying, via searching the searchable index, elements of records in the set of records.

7. The method of claim 1, wherein said applying the general context to the set of records comprises:
 delimiting the subset of the set of records comprising one or more of the records that include a reference to the general context, wherein said delimiting is based on searching the set of records for references to the general context.

8. The method of claim 1, wherein said applying the general context to the set of records to select a subset of the records for further processing comprises:
 flagging each record in the set of records that includes a reference to the general context, wherein the flagged records define the subset of the set of records; and
 selecting a predefined portion of the flagged records for said further processing.

9. The method of claim 1, wherein said applying the general context to the set of records to select a subset of the records for further processing comprises:
 flagging each record in the set of records that contains a title field whose title matches the general context, wherein the flagged records define the subset of the set of records; and
 selecting the flagged records for said further processing.

10. The method of claim 1, wherein:
 each record in the set of records:
  is an item record describing a particular item; and
  includes at least one item attribute field containing an attribute describing the particular item, and further includes an associated value field containing a value of the attribute;
 said applying the general context comprises searching the set of records to select each record in the set of records which includes a reference to the general context; and
 said further processing comprises:
  extracting multiple substrings from the descriptor of the item;
  for each extracted substring of said multiple extracted substrings, searching the selected one or more records to identify each inclusion of the extracted substring in an attribute or value of a record of the selected one or more records; and
  compiling, for inclusion in a report for the item, a set of the item attributes and associated values identified, during said searching the selected one or more records, as including one of the extracted substrings.

11. The method of claim 1, wherein:
 each record in the set of records:
  is an item record describing a particular item;
  includes at least one item attribute field containing an attribute describing the particular item, and further includes an associated value field containing a value of the attribute;

said applying the general context comprises searching the set of records to select each record in the set of records which includes a reference to the general context; and
said further processing comprises:
 extracting, from ones of the previously-stored customer item search queries that include the general context, one or more terms that do not match the general context;
 for each extracted term of the one or more terms extracted from the previously-stored customer item search queries, searching the selected one or more records to identify each inclusion of the extracted term in an attribute or value of a record of the selected one or more records; and
 compiling, for inclusion in a report for the item, a set of the item attributes and associated values identified, during said searching the selected one or more records, as including one of the one or more extracted terms.

12. A server system, comprising:
a processor; and
a memory operatively coupled to the processor, components of the memory comprising an item data manager stored on the memory and executed by the processor to automatically perform:
 acquiring a descriptor of an item from a merchant of the item;
 determining a general context for the item, wherein said determining comprises:
  extracting one or more phrases from the descriptor, each phrase comprising one or more alphanumeric words that are included in the descriptor;
  for each of the one or more phrases:
   searching an index of previously-stored customer item search queries to identify occurrences of the phrase within the customer item search queries; and
   accumulating how many times the phrase is identified during said searching; and
  selecting the general context to be one of the one or more phrases most frequently identified during said searching; and
 applying the general context to a set of records to select a subset of the records for further processing.

13. A method comprising:
performing, by a computing device:
 acquiring a descriptor of an item from a merchant of the item;
 extracting multiple substrings from the descriptor of the item, each substring comprising one or more alphanumeric words that are included in the descriptor;
 for each extracted substring of said multiple extracted substrings, identifying which item attributes of an item attribute index contain the extracted substring;
 selecting, for inclusion in a report for the item, a subset of the item attributes identified as containing one of the multiple extracted subsrings;
 extracting one or more terms from a set of customer queries pertaining to the item;
 for each extracted term of the one or more terms extracted from the set of customer queries, identifying which item attributes of the item attribute index contain the extracted term;
 selecting, for inclusion in the report, another subset of the item attributes identified as containing one of the one or more extracted terms; and
 generating the report including both the subset and the another subset of the item attributes.

14. The method of claim 13, wherein:
the descriptor of the item is a descriptive title for the item; and
each of the extracted multiple substrings comprises one or more alphanumeric terms.

15. The method of claim 13, wherein the item attribute index indexes a set of records, and each record in the set of records:
is an item record describing a particular item;
includes a title field containing a title describing the particular item; and
includes at least one item attribute field containing an item attribute describing the particular item.

16. The method of claim 15, wherein each item attribute field of each item record includes an associated value field containing a value of the attribute contained in the attribute field.

17. The method of claim 15, wherein the item attribute index is configured for identifying, via searching the item attribute index, elements of records in the set of records.

18. The method of claim 15, wherein said identifying which item attributes of the item attribute index contain the extracted substring comprises:
 searching the item attribute index, wherein said searching the item attribute index comprises:
  identifying within the item records each item attribute in the item attribute index that contains the extracted substring; and
  increasing a running total indicating a number of times the identified item attribute has been identified during said searching the item attribute index.

19. The method of claim 18, further comprising:
sorting the item attributes identified during said searching the item attribute index, wherein said sorting is based on comparing the running totals of the identified item attributes;
wherein said selecting the subset of the item attributes identified as containing one of the multiple extracted substrings is based on said sorting, and the selected subset comprises the item attributes most frequently identified during said searching the item attribute index.

20. The method of claim 18, wherein said searching the item attribute index is limited to item records that match a general context for the item.

21. The method of claim 20, further comprising determining the general context for the item, wherein said determining the general context comprises:
 extracting one or more phrases, each phrase comprising one or more alphanumeric words included in the descriptor;
 for each of the one or more phrases:
  searching the set of customer queries to identify occurrences of the phase within the act of customer queries; and
  accumulating how many times the phrase is identified during said searching the set of customer queries; and
 selecting the general context to be one of the one or more phrases most frequently identified during said searching the set of customer queries.

22. The method of claim 13, wherein the set of customer queries includes customer item search queries that each comprise a previous search by a prospective customer for one or more items, wherein the previous search is conducted on the prospective customer's client device via a browser application running on the customer's client device.

23. The method of claim 13, wherein each query in the set of customer queries match e a general context for the item.

24. The method of claim 23, wherein said extracting one or more terms from the set of customer queries pertaining to the item comprises:
  extracting, from each customer query in the set of customer queries, each term that does not match the general context;
  discarding redundant terms generated during said extracting each term; and
  creating a set of terms generated via said extracting one or more terms from the set of customer queries.

25. The method of claim 24, wherein
the item attribute index indexes a set of records, and each record in the set of records:
  is an item record describing a particular item;
  includes a title field containing a title describing the particular item; and
  includes at least one item attribute field containing an item attribute describing the particular item; and
said identifying which item attributes of the item attribute index contain the extracted term comprises:
  searching the item attribute index, wherein said searching the item attribute index comprises:
    identifying within the item records each item attribute in the item attribute index that contains the extracted term; and
    increasing a running total indicating a number of times the identified item attribute has been identified during said searching the item attribute index.

26. The method of claim 25, wherein said searching the item attribute index compares the extracted term against attributes contained in the attribute fields of the item attribute index and against values that correspond to the attributes contained in the attribute fields.

27. The method of claim 25, further comprising:
  sorting the item attributes identified during said searching the item attribute index, wherein said sorting is based on comparing the running totals of the identified item attributes;
  wherein said selecting the another subset of the item attributes identified as containing one of the extracted terms is based on said sorting, and the selected another subset comprises the item attributes most-frequently identified during said searching the item attribute index.

28. The method of claim 25, wherein said searching the item attribute index is limited to item records that match the general context for the item.

29. The method of claim 23, further comprising determining the general context for the item, wherein said determining the general context comprises:
  extracting, from the descriptor of the item, one or more phrases, each phrase comprising one or more alphanumeric words included in the descriptor;
  for each of the one or more phrases:
    searching the set of customer queries to identify occurrences of the phrase within the set of customer queries; and
    accumulating how many times the phrase is identified during said searching the set of customer queries; and
  selecting the general context to be one of the one or more phrases most frequently identified during said searching the set of customer queries.

30. The method of claim 13, further comprising generating the set of customer queries based on searching a previously-stored customer item search query index to identify which indexed customer item search queries include a general context for the item.

31. A saver system, comprising:
  a processor;
  a memory operatively coupled to the processor, components of the memory comprising an item data manager stored on the memory and executed by the processor to automatically perform:
    acquiring a descriptor of an item from a merchant of the item;
    extracting multiple substrings from the descriptor of the item, each substring containing one or more words included in the descriptor;
    for each extracted substring of said multiple extracted substrings, identifying which item attributes of an item attribute index contain the extracted substring;
    selecting, for inclusion in a report for the item, a subset of the item attributes identified as containing one of the multiple extracted substrings;
    extracting one or more terms from a set of customer queries pertaining to the item;
    for each extracted term of the one or more terms extracted from the set of customer queries, identifying which item attributes of the item attribute index contain the extracted term;
    selecting, for inclusion in the report, another subset of the item attributes identified as containing one of the one or more extracted terms; and
    generating the report including both the subset and the another subset of the item attributes.

32. The system of claim 31, wherein the descriptor of the item includes a descriptive title of the item.

* * * * *